United States Patent
Akiyama et al.

(10) Patent No.: US 11,606,016 B2
(45) Date of Patent: Mar. 14, 2023

(54) LINEAR MOTOR

(71) Applicant: FUJI ELECTRIC CO., LTD., Kanagawa (JP)

(72) Inventors: Terukazu Akiyama, Tokyo (JP); Satoshi Imamori, Tokyo (JP); Yusuke Konno, Kanagawa (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 17/354,066

(22) Filed: Jun. 22, 2021

(65) Prior Publication Data

US 2022/0069691 A1    Mar. 3, 2022

(30) Foreign Application Priority Data

Aug. 31, 2020   (JP) .............................. JP2020-145259

(51) Int. Cl.
*H02K 41/03*    (2006.01)

(52) U.S. Cl.
CPC ................................. *H02K 41/031* (2013.01)

(58) Field of Classification Search
CPC .................................................... H02K 41/031
See application file for complete search history.

(56) References Cited

U.S. PATENT DOCUMENTS 8,810,082 B2    8/2014  Aoyama et al.
2010/0026104 A1*  2/2010  Jajtic ..................... B23B 29/125
                                              310/12.22

FOREIGN PATENT DOCUMENTS

| CN | 108667261 B | * | 7/2020 | ........... H02K 41/031 |
|---|---|---|---|---|
| JP | H03-245764 | | 11/1991 | |
| JP | H04-183260 | | 6/1992 | |
| JP | 2008312405 A | * | 12/2008 | |
| JP | 2011-067030 | | 3/2011 | |
| JP | 5313333 | | 10/2013 | |
| WO | WO-03098783 A1 | * | 11/2003 | ........... H02K 41/033 |

* cited by examiner

*Primary Examiner* — Mohamad A Musleh
(74) *Attorney, Agent, or Firm* — IPUSA, PLLC (57) ABSTRACT

A linear motor includes an armature that includes a coil and a core made of a soft magnetic material, and a field magnet that includes a permanent magnet generating a magnetic field for the armature. One of the armature or the field magnet is a mover and the other of the armature or the field magnet is a stator, and the stator includes a first section and a second section. The armature and the field magnet are arranged such that the mover is interposed between the first and second sections, and at least one of the armature or the field magnet is configured to have an asymmetrical property between first and second magnetic actions. The first magnetic action is caused by the permanent magnet between the mover and the first section, and the second magnetic action is caused by the permanent magnet between the mover and the second section.

11 Claims, 8 Drawing Sheets

LINEAR MOTOR

CROSS-REFERENCE TO RELATED APPLICATION

This application is based upon and claims priority to Japanese Patent Application No. 2020-145259, filed on Aug. 31, 2020, the entire contents of which are incorporated herein by reference.

BACKGROUND OF THE INVENTION

1. Field of the Invention

The present disclosure relates to a linear motor.

2. Description of the Related Art

In linear motors, a conventional technique for canceling the magnetic attraction force between a permanent field magnet and an armature (i.e., a core made of a soft magnetic material) is to interpose the armature between the permanent field magnets that are arranged facing each other or to interpose the permanent field magnet between the armatures that are arranged facing each other (see Patent Documents 1 and 2), for example.

Patent Document 1 describes a linear motor that includes an armature as a mover, and permanent field magnets arranged such that the armature is interposed between the permanent field magnets, as stators.

Patent Document 2 describes a linear motor that includes a permanent field magnet as a mover, and armatures arranged such that the permanent field magnet is interposed between the armatures, as stators.

However, support mechanisms such as slide rails and linear guides that support the mover generally have a certain movable range (what is called allowance) in the axial direction in which the permanent field magnet faces the armature. Thus, if the displacement position of the mover is shifted from a reference position, where the magnetic attraction force is canceled in the axial direction in which the permanent field magnet faces the armature, a magnetic attraction force may be generated on the mover. In particular, if the displacement is repeated such that the mover moves past the reference position, a direction of the magnetic attraction force acting on the mover switches in a different direction at a high frequency, and as a result, vibration of the mover may be induced.

With respect to the above, by adopting a support mechanism that can reduce the movable range of the mover so as to be relatively small, vibration can be suppressed. However, this may complicate the support mechanism or increase the size of the support mechanism, and may increase the cost.

Therefore, in view of the above-described problems, it is desirable to provide a technique for suppressing vibration of the mover with a simpler support mechanism in a linear motor configured such that the armature is interposed between the permanent field magnets, or the permanent field magnet is interposed between the armatures.

RELATED-ART DOCUMENTS

Patent Document

[Patent Document 1] Japanese Laid-open Patent Publication No. 2011-67030
[Patent Document 2] Japanese Patent No. 5313333

SUMMARY OF THE INVENTION

According to one aspect of an embodiment, a linear motor includes an armature that includes a coil and a core made of a soft magnetic material, and a field magnet that includes a permanent magnet generating a magnetic field for the armature. One of the armature or the field magnet is a mover and the other of the armature or the field magnet is a stator, and the stator includes a first section and a second section. The armature and the field magnet are arranged such that the mover is interposed between the first section and the second section, and at least one of the armature or the field magnet is configured to have an asymmetrical property between a first magnetic action and a second magnetic action. The first magnetic action is caused by the permanent magnet between the mover and the first section, and the second magnetic action is caused by the permanent magnet between the mover and the second section.

According to at least one embodiment, vibration of the mover can be suppressed with a simpler support mechanism in a linear motor configured such that one of the permanent field magnet or the armature is interposed between the others.

DETAILED DESCRIPTION OF THE EMBODIMENTS

In the following, the embodiments will be described with reference to the drawings.

First Embodiment

First, with reference to FIG. 1 and FIG. 2, a linear motor 1 according to a first embodiment will be described.

The linear motor 1 may be incorporated into opening and closing mechanisms of various sliding doors, such as rail vehicle doors and station platform doors. The linear motor 1 may also be mounted, for example, in a semiconductor manufacturing device. In the following, the same applies to the second to fourth embodiments described later.

<Configuration of the Linear Motor>

Figure 1:
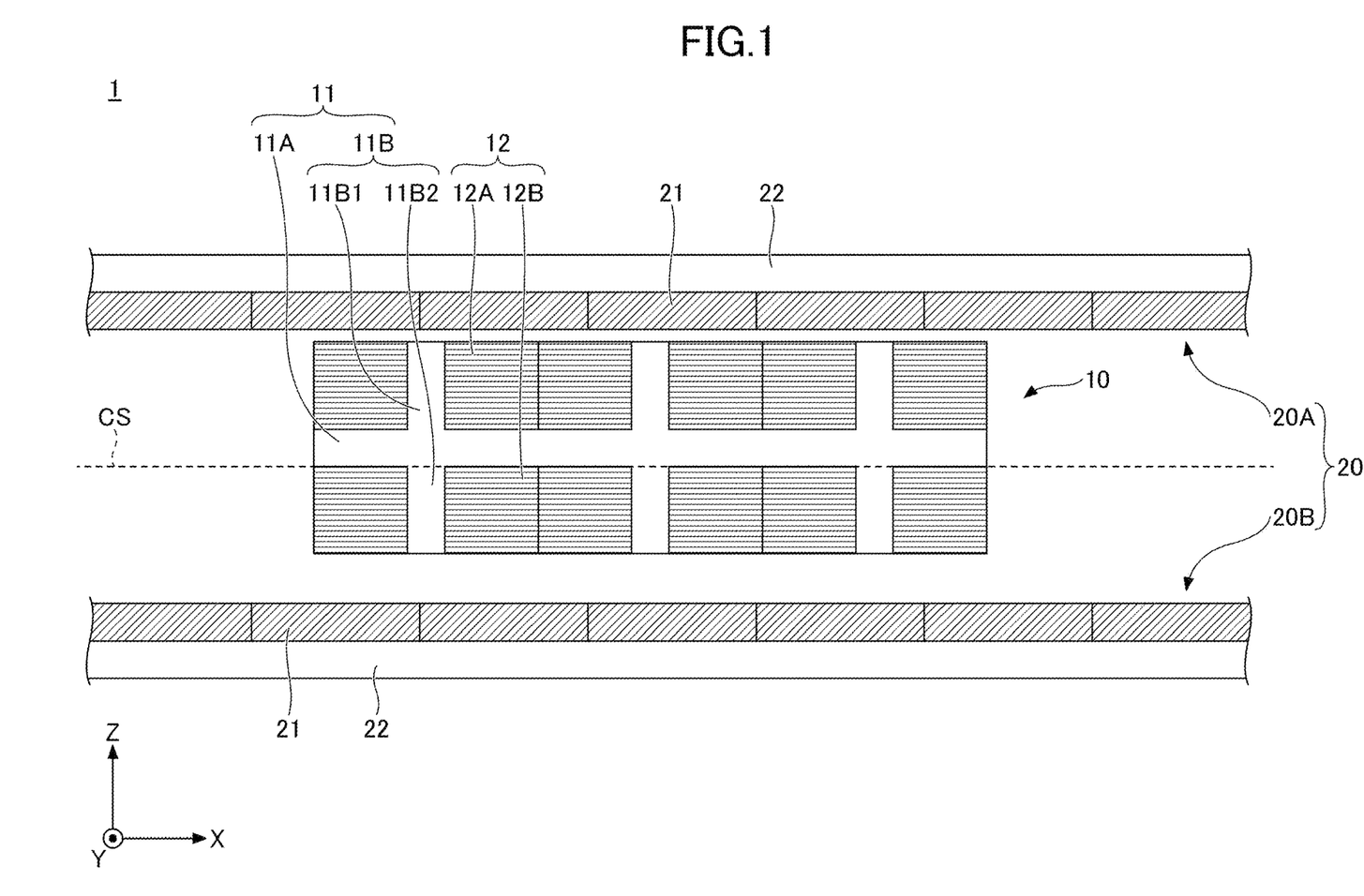
FIG. 1 is a drawing illustrating an example of a linear motor according to a first embodiment.

FIG. 1 is a drawing illustrating an example of the linear motor 1 according to the first embodiment.

As illustrated in FIG. 1, the linear motor 1 includes an armature 10 and a field magnet 20.

The armature 10 is a mover. The armature 10 is interposed in the Z-axis direction between the field magnet sections 20A and 20B of the field magnet 20. The field magnet sections 20A and 20B are arranged to extend along the X-axis direction. The armature 10 is supported such that the armature 10 is movable in the X-axis direction by, for example, a support mechanism such as a slide rail or a linear guide. The armature 10 is allowed to have a predetermined amount of a movable range (what is called allowance) in the Z-axis direction by the support mechanism.

The armature 10 includes a core 11 and a coil 12.

The core 11 functions as a magnetic path of a magnetic field generated by the armature current of the coil 12 and a magnetic field from a permanent magnet 21 of the field magnet 20. The core 11 is made of, for example, a soft magnetic material such as an electrical steel plate or a powder magnetic core. The entirety of the core 11 is made of the same soft magnetic material and has substantially the same magnetic permeability throughout.

The core 11 includes a back yoke 11A and teeth 11B.

The back yoke 11A has a predetermined thickness in the Z-axis direction and extends in the X-axis direction.

The teeth 11B include teeth 11B1 and 11B2.

The teeth 11B1 are provided to protrude from the back yoke 11A in the positive Z-axis direction. In this example, three teeth 11B1 are provided at equal intervals in the X-axis direction. The number of the teeth 11B1 may be two or less, or four or greater. In the following, the same applies to the teeth 11B2.

The teeth 11B2 is provided to protrude from the back yoke 11A in the negative Z-axis direction. In this example, three teeth 11B2 are provided at equal intervals in the X-axis direction and at positions substantially the same as the positions of the teeth 11B1. "Substantially" indicates, for example, permitting the manufacturing error, and the like, and is used in the similar meaning in the following.

The teeth 11B1 and 11B2 are configured such that the amounts of protrusions in the Z-axis direction from the back yoke 11A are substantially the same. Thus, the armature 10 (i.e., the core 11) has a shape substantially symmetrical in the Z-axis direction with respect to the back yoke 11A (specifically, the central plane of the back yoke 11A in the Z-axis direction).

The coil 12 includes coils 12A and 12B.

When the armature current flows through the coil 12A, the interaction with a magnetic field generated from the field magnet section 20A causes the generation of the thrust that moves the mover (i.e., the armature 10). The coil 12A is formed of a conductive wire wound around each of the teeth 111B1. As with the teeth 11B1, three coils 12A are provided at equal intervals in the X-axis direction, and, to each of the coils 12A, for example, three-phase electric power of U-phase, V-phase, and W-phase is provided.

When the armature current flows through the coil 12B, the interaction with a magnetic field generated from the field magnet section 20B causes the generation of the thrust that moves the mover (i.e., the armature 10). The coil 12B is formed of a wire wound around each of the teeth 11B2. As with the teeth 11B2, three coils 12B are provided at equal intervals in the X-axis direction and to each of the coils 12B, for example, three-phase electric power of U-phase, V-phase, and W-phase is provided.

The armature 10 is disposed such that the central plane of the armature 10 in the Z-axis direction (hereinafter, the "armature reference plane") is shifted toward the field magnet section 20A from the central plane CS between the field magnet sections 20A and 20B in the Z-axis direction (hereinafter, the "in-field-magnet central plane"). Specifically, the armature 10 is disposed such that the armature reference plane is shifted from the in-field-magnet central plane CS toward the field magnet section 20A throughout the entire movable range allowed by the support mechanism.

The field magnet 20 is a stator. The field magnet 20 extends in the X-axis direction, and the length of the field magnet 20 in the X-axis direction is defined in accordance with the movement amount of the armature 10 in the X-axis direction as a mover.

The field magnet 20 includes the field magnet sections 20A and 20B.

The field magnet sections 20A and 20B extend in the X-axis direction substantially parallel to each other. Between the field magnet sections 20A and 20B, a predetermined distance is provided in the Z-axis direction, and the predetermined distance is set to be larger than the length of the armature 10 in the Z-axis direction to some extent. For example, the distance between the field magnet sections 20A and 20B corresponds to an amount calculated by adding the movable amount of the supporting mechanism (e.g., a slide rail or a linear guide) of the armature 10 in the Z-axis direction and a predetermined margin to the length of the armature 10 in the Z-axis direction. This allows the armature 10, when acting as a mover, to move in the X-axis direction without contacting the field magnet sections 20A and 20B.

The field magnet section 20A (i.e., an example of a first section) faces the armature 10 as viewed in the positive Z-axis direction from the armature 10. The field magnet section 20A generates a magnetic flux that interlinks the coil 12A of the armature 10.

The field magnet section 20B (i.e., an example of a second section) faces the armature 10 as viewed in the negative Z-axis direction from the armature 10. The field magnet section 20B generates a magnetic flux that interlinks the coil 12B of the armature 10.

Each of the field magnet sections 20A and 20B includes a permanent magnet 21 and a back yoke 22.

The permanent magnets 21 are arranged side by side in the X-axis direction so as to face the armature 10 in the Z-axis direction. For example, the permanent magnet 21 is magnetized in the Z-axis direction opposite to the armature 10 and is disposed such that a magnetic pole of a surface facing the armature 10 differs from other permanent magnets 21 adjacent in the X-axis direction. For example, the permanent magnets 21 may be arranged side by side in an X-axis direction in a Halbach array so that the magnetic flux of the magnetic pole facing the armature 10 is relatively strong.

The field magnet section 20A and the field magnet section 20B are configured such that the magnetic specifications (e.g., the shape, the dimensions, the residual magnetic flux density, and the like) and the arrangement specifications (e.g., the arrangement positions of the permanent magnets 21 in the X-axis direction, a way of the arrangement including the presence or absence of the Halbach array, and the like) of the permanent magnets 21 are substantially the same. This enables the field magnet section 20A and the field magnet section 20B to generate substantially symmetrical magnetic fields with respect to the in-field-magnet central plane CS in the space between the field magnet section 20A and the field magnet section 20B, which face each other in the Z-axis direction.

The back yoke 22 is arranged adjacent to a surface of the permanent magnet 21 that is opposite to the surface facing the armature 10 in the Z-axis direction. The back yoke 22 functions as a magnetic path between adjacent permanent magnets 21.

<Magnetic Attraction Force Acting on the Mover>

Figure 2:
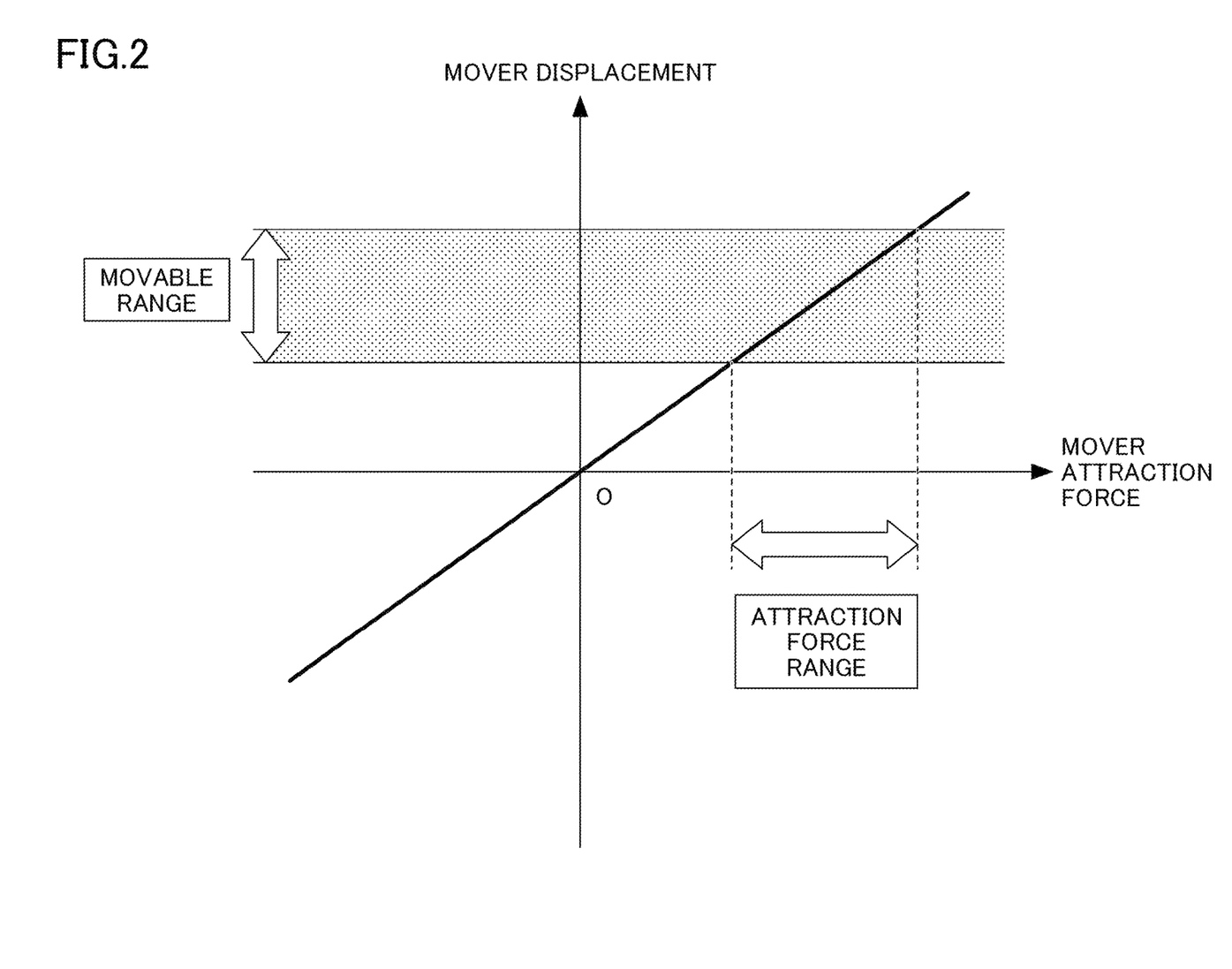
FIG. 2 is a graph illustrating a relation of the displacement of a mover and the attraction force acting on the mover.

FIG. 2 is a graph illustrating a relation between the displacement (in the Z-axis direction) of the mover and the attraction force acting on the mover (i.e., the armature 10). Specifically, the graph indicates the relation between the displacement position of the armature 10 in the Z-axis direction with respect to the in-field-magnet central plane CS and the magnetic attraction force acting on the armature 10 (i.e., the core 11) in the Z-axis direction that is caused by the interaction between the armature 10 (i.e., the core 11) and the field magnet 20 (i.e., the permanent magnets 21). The displacement position of the armature 10 in the Z-axis direction is defined based on the armature reference plane.

As described above, the magnetic fields generated by the field magnet section 20A and the field magnet section 20B are substantially symmetrical with respect to the in-field-magnet central plane CS. The core 11 of the armature 10 has the same magnetic permeability throughout and has a shape substantially symmetrical in the Z-axis direction with respect to the armature reference plane. Thus, if the displacement position of the armature 10 is at the in-field-magnet central plane CS, the magnetic attraction force acting on the armature 10 from the field magnet section 20A and the magnetic attraction force acting on to the armature 10 from the field magnet section 20B become substantially equal, and thus are canceled. Therefore, as illustrated in FIG. 2, if it is assumed that the displacement position of the armature 10 is at the in-field-magnet central plane CS, the magnetic attraction force acting on the armature 10 becomes zero.

If the displacement position of the armature 10 is shifted from the in-field-magnet central plane CS in the positive Z-axis direction, the magnetic attraction force acting on the armature 10 from the field magnet section 20A in the positive Z-axis direction increases, and the magnetic attraction force acting on the armature 10 from the field magnet section 20B in the negative Z-axis direction decreases. Further, as the shift amount increases, a difference between the magnetic attraction force acting on the armature 10 from the field magnet section 20A in the positive Z-axis direction and the magnetic attraction force acting on the armature 10 from the field magnet section 20B in the negative Z-axis direction increases in a substantially proportional manner. Therefore, as illustrated in FIG. 2, if the displacement position of the armature 10 is shifted from the in-field-magnet central plane CS in the positive Z-axis direction, the magnetic attraction force acting on the armature 10 in the positive Z-axis direction increases substantially in proportion to the shift amount.

Likewise, if the displacement position of the armature 10 is shifted from the in-field-magnet central plane CS in the negative Z-axis direction, the magnetic attraction force acting on the armature 10 from the field magnet section 20A in the positive Z-axis direction decreases, and the magnetic attraction force acting on the armature 10 from the field magnet section 20B in the negative Z-axis direction increases. Further, as the shift amount increases, a difference between the magnetic attraction force acting on the armature 10 from the field magnet section 20B in the negative Z-axis direction and the magnetic attraction force acting on the armature 10 from the field magnet section 20A in the positive Z-axis direction increases in a substantially proportional manner. Therefore, as illustrated in FIG. 2, if the displacement position of the armature 10 is shifted from the in-field-magnet central plane CS in the negative direction of the Z-axis, the magnetic attraction force acting on the armature 10 in the negative Z-axis direction increases substantially in proportion to the shift amount.

According to the example described above, the armature 10 is disposed such that the armature reference plane is shifted from the in-field-magnet central plane CS toward the field magnet section 20A, that is, shifted in the positive Z-axis direction throughout the movable range allowed by the support mechanism. Thus, as illustrated in FIG. 2, the movable range of the armature 10 is defined in a range that is shifted from the in-field-magnet central plane CS in the positive Z-axis direction. Therefore, the armature 10 can be configured so that a constant magnetic attraction force is applied to the armature 10 in the positive Z-axis direction within the movable range allowed by the support mechanism.

The armature 10 may be disposed such that the armature reference plane is shifted from the in-field-magnet central plane CS toward the field magnet section 20B, that is, shifted in the negative Z-axis direction throughout the movable range allowed by the support mechanism. In this case, the armature 10 can be configured so that a constant magnetic attraction force is applied to the armature 10 in the negative Z-axis direction within the movable range allowed by the support mechanism.

Here, the armature 10 may be configured so that the magnetic attraction force is applied, to the armature 10 in one direction of the positive Z-axis direction or the negative Z-axis direction mostly in the movable range in the Z-axis direction, and the magnetic attraction force is applied to the armature 10 in the other direction of the positive Z-axis direction or the negative. Z-axis direction in the remaining portion (i.e., an end portion) of the movable range. That is, the movable range of the armature 10 may be mostly on one side of either the positive Z-axis direction or the negative Z-axis direction; a remaining portion of the movable range is on another side of either the positive Z-axis direction or the negative Z-axis direction.

As described, in the first embodiment, the armature 10 is configured to have an asymmetrical property between the magnetic action caused by the permanent magnet 21 between the armature 10 and the field magnet section 20A and the magnetic action caused by the permanent magnet 21 between the armature 10 and the field magnet section 20B. Specifically, the armature 10 is disposed to be shifted toward either the field magnet section 20A or the field magnet section 20B in the Z-axis direction.

This enables the armature 10 to be configured so that the direction of the force acting on the armature 10 in the Z-axis direction does not readily change. Therefore, vibration of the armature 10 can be suppressed. Further, in order to suppress vibration of the armature 10, it is not necessary to employ a support mechanism which can reduce the movable range so as to be relatively small, and thus an increase in the cost of the linear motor 1 including the support mechanism can be suppressed.

In the first embodiment, the armature 10 may have the above-described asymmetrical property so that the magnetic attraction force acting on the armature 10 in the Z-axis direction throughout the entire movable range of the mover in the Z-axis direction is either in a direction toward the field magnet section 20A or in a direction toward the field magnet section 20B.

Because this does not change the direction of the force acting on the armature 10 in the Z-axis direction, vibration of the armature 10 can be further suppressed. In addition, because the direction of the force acting on the armature 10 is limited to the positive Z-axis direction or the negative Z-axis direction, only a load in the positive Z-axis direction or the negative Z-axis direction is required to be considered in the design of the support mechanism. Thus, a simple support mechanism can be employed in contrast with cases where loads in both the positive Z-axis direction and the negative Z-axis direction are considered. Therefore, an increase in the cost of the linear motor 1 including the support mechanism can be further reduced.

Second Embodiment

Next, with reference to FIG. 3 and FIG. 4, a linear motor 1 according to a second embodiment will be described.

In the following, parts different from the first embodiment will be mainly described, and the description of contents the same as or corresponding to the first embodiment may be simplified or omitted.

<Configuration of the Linear Motor>

Figure 3:
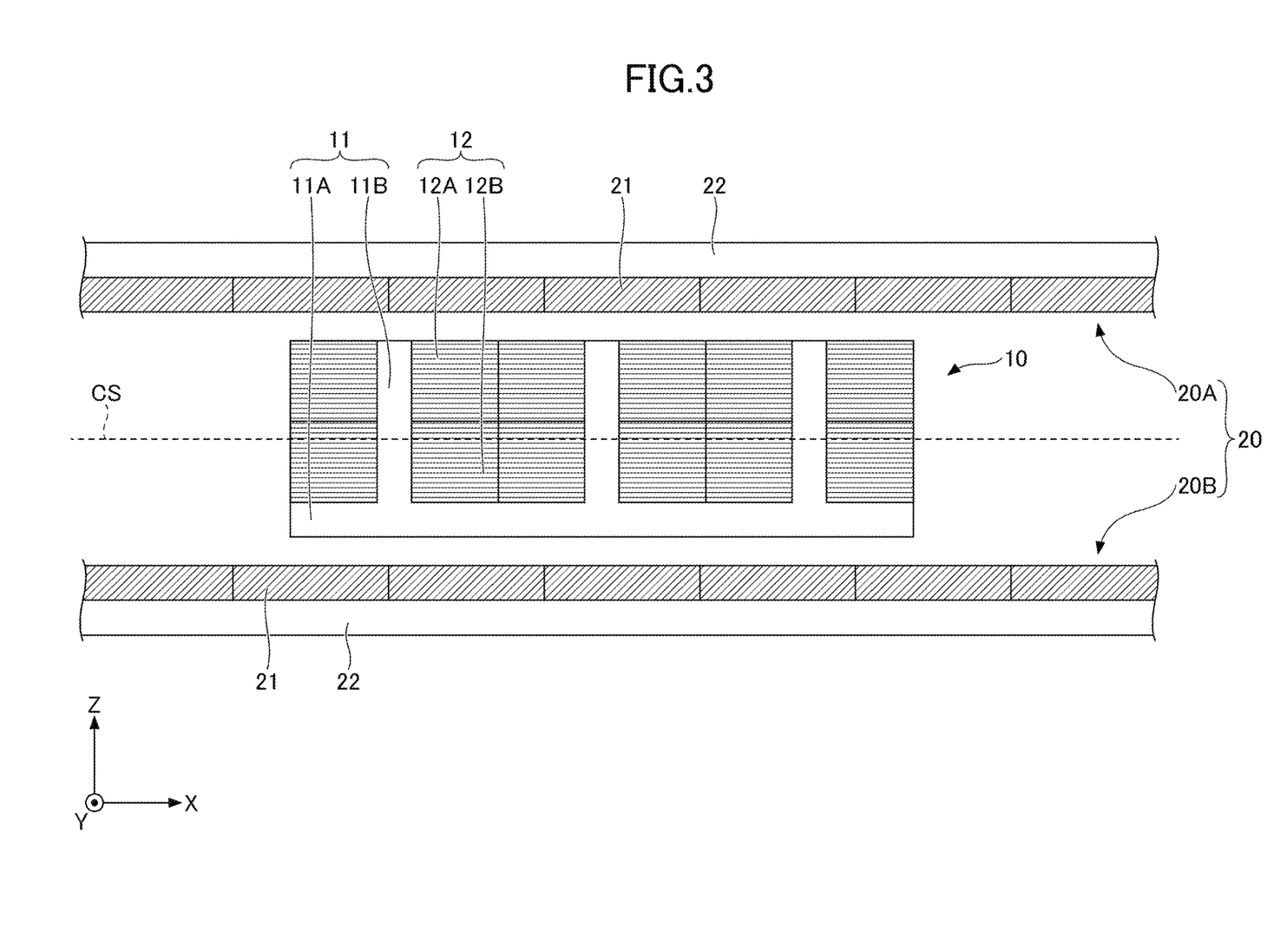
FIG. 3 is a drawing illustrating an example of a linear motor according to a second embodiment.

FIG. 3 is a drawing illustrating an example of the linear motor 1 according to the second embodiment.

As illustrated in FIG. 3, as in the first embodiment, the linear motor 1 includes the armature 10 and the field magnet 20.

As in the first embodiment, the armature 10 is a mover and includes the core 11 and the coil 12.

As in the first embodiment, the entirety of the core 11 is made of the same soft magnetic material and has substantially the same magnetic permeability throughout. The core 11 includes the back yoke 11A and the teeth 11B.

As in the first embodiment, the back yoke 11A has a predetermined thickness in the Z-axis direction and extends in the X-axis direction.

The teeth 11B are provided to protrude from the back yoke 11A in the positive Z-axis direction. Three teeth 11B are provided at equal intervals in the X-axis direction. The number of the teeth 11B may be two or less, or four or greater.

Because the teeth 11B are arranged such that the coils 12A and 12B are overlapped in the Z-axis direction as described later, the protrusion amount in the positive Z-axis direction is set longer than the protrusion amount in the first embodiment (i.e., the protrusion amount of the teeth 11B1).

The coil 12 includes the coils 12A and 12B.

The coil 12A is formed of a conductive wire wound around a tip end portion of each of the teeth 11B such that the coil 12A is provided adjacent to the coil 12B in the positive Z-axis direction.

The coil 12B is formed of a conductive wire wound around a tip end portion of each of the teeth 11B such that the coil 12B is provided adjacent to the coil 12A in the negative Z-axis direction.

As illustrated in FIG. 3, the armature 10 is disposed such that the armature reference plane is aligned with the in-field-magnet central plane CS at a predetermined displacement position (hereinafter referred to as a "reference displacement position") within the movable range. That is, the armature 10 is disposed at a substantially central position in the Z-axis direction between the field magnet sections 20A and 20B. The shape of the core 11 of the armature 10 is asymmetrical with respect to the armature reference plane.

<Magnetic Attraction Force Acting on the Mover>

Figure 4:
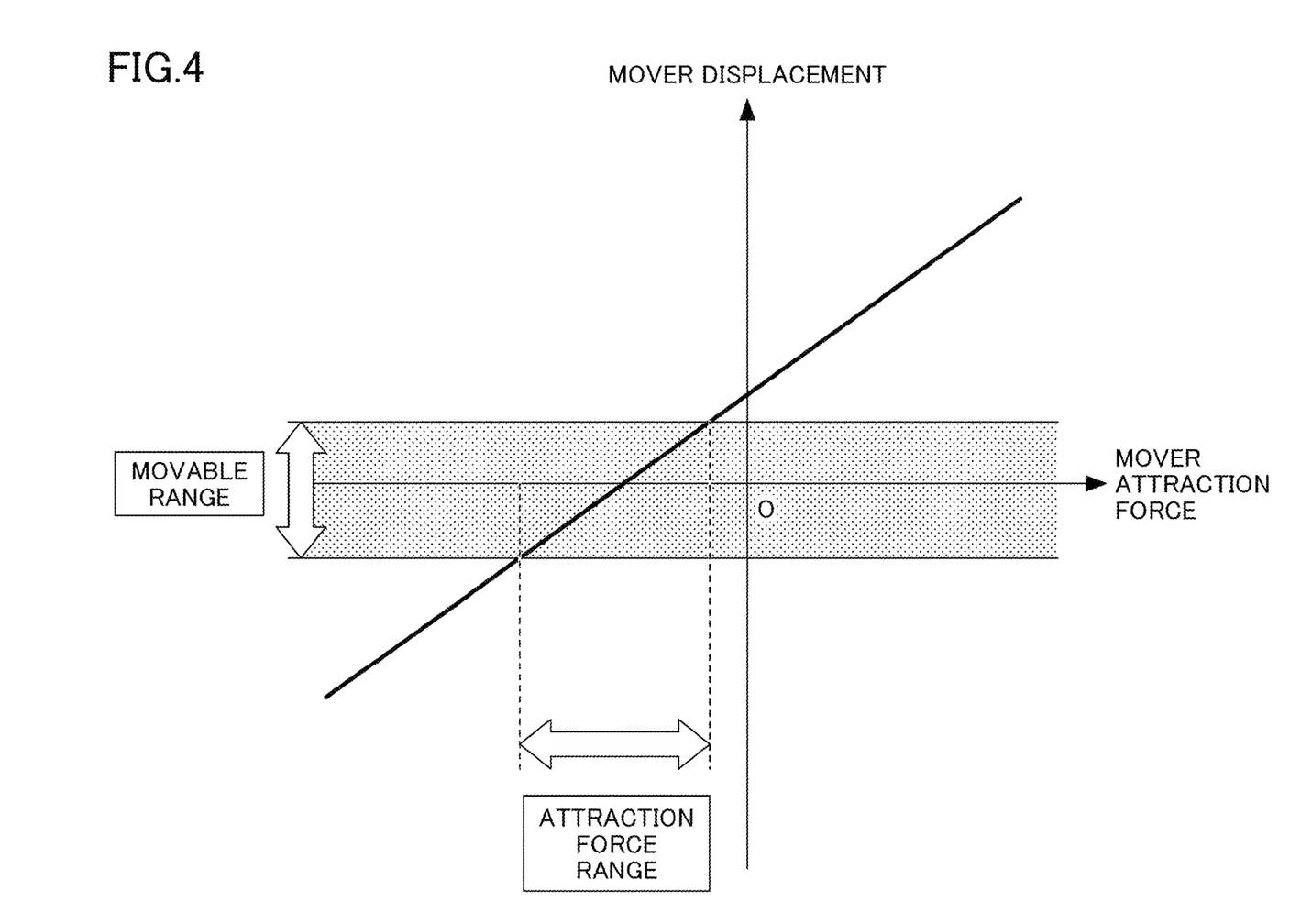
FIG. 4 is a graph illustrating a relation of the displacement of the mover and the attraction force acting on the mover.

FIG. 4 is a graph illustrating a relation between the displacement of the mover (in the Z-axis direction) and the attraction force acting on the mover (i.e., the armature 10). Specifically, the graph indicates the relation between the displacement position of the armature 10 in the Z-axis direction with respect to the in-field-magnet central plane CS and the magnetic attraction force acting on the armature 10 (i.e., the core 11) in the Z-axis direction that is caused by the interaction between the armature 10 (i.e., the core 11) and the field magnet 20 (i.e., the permanent magnets 21). The displacement position of the armature 10 in the Z-axis direction is defined based on the armature reference plane.

As described above, the magnetic fields generated by the field magnet section 20A and the field magnet section 20B are substantially symmetrical with reference to the in-field-magnet central plane CS. The core 11 of the armature 10 has the same magnetic permeability throughout and has an asymmetrical shape with respect to the armature reference plane. As a result, even if the displacement position of the armature 10 is at the in-field-magnet central plane CS, the magnetic attraction force acting on the armature 10 from the field magnet section 20B is greater than the magnetic attraction force acting on the armature 10 from the field magnet section 20A, and the magnetic attraction force is applied to the armature 10 in the negative Z-axis direction. This is because the back yoke 11A is provided at the end of the armature 10 in the negative Z-axis direction so as to extend in the X-axis direction.

If the displacement position of the armature 10 is shifted from the in-field-magnet central plane CS in the positive Z-axis direction, the magnetic attraction force acting on the armature 10 from the field magnet section 20B in the negative Z-axis direction decreases, and the magnetic attraction force acting on the armature 10 from the field magnet section 20A in the positive Z-axis direction increases. As the shift amount increases, the difference between the magnetic attraction force acting on the armature 10 from the field magnet section 20B in the negative Z-axis direction and the magnetic attraction force acting on the armature 10 from the field magnet section 20A in the positive Z-axis direction is decreased in a substantially proportional manner. If the displacement position of the armature 10 is shifted from the in-field-magnet central plane CS in the positive Z-axis direction to some extent, the magnitude relation between the magnetic attraction force acting on the armature 10 from the field magnet section 20B and the magnetic attraction force acting on the armature 10 from the field magnet section 20A is reversed. Thus, as illustrated in FIG. 4, if the displacement position of the armature 10 is shifted from the in-field-magnet central plane CS in the positive Z-axis direction, the magnetic attraction force acting on the armature 10 in the negative Z-axis direction decreases substantially in proportion to the shift amount, and the magnetic attraction force acting on the armature 10 is zero at a certain shift amount. If the displacement position of the armature 10 is further shifted from a position corresponding to the certain shift amount in the positive Z-axis direction, the magnetic attraction force acting on the armature 10 in the positive Z-axis direction increases substantially in proportion to the shift amount.

If the displacement position of the armature 10 is shifted from the in-field-magnet central plane CS in the negative Z-axis direction, the magnetic attraction force acting on the armature 10 from the field magnet section 20B in the negative Z-axis direction further increases, and the magnetic attraction force acting on the armature 10 from the field magnet section 20A in the positive Z-axis direction is further reduced. As the shift amount increases, the difference between the magnetic attraction force acting on the armature 10 from the field magnet section 20B in the negative Z-axis direction and the magnetic attraction force acting on the armature 10 from the field magnet section 20A in the positive Z-axis direction increases in a substantially proportional manner. Therefore, as illustrated in FIG. 4, if the displacement position of the armature 10 is shifted from the in-field-magnet central plane CS in the negative Z-axis direction, the magnetic attraction force acting on the armature 10 in the negative Z-axis direction further increases substantially in proportion to the shift amount.

In this example, as illustrated in FIG. 3, the armature 10 is disposed substantially at the center in the Z-axis direction between the field magnet sections 20A and 20B so as to include a position in the Z-axis direction that corresponds to the in-field-magnet central plane CS within the movable range of the support mechanism. Therefore, as illustrated in FIG. 4, the movable range allowed by the support mechanism of armature 10 is set to be in the range in the positive Z-axis direction and the negative Z-axis direction centered on the in-field-magnet central plane CS.

With respect to the above, the magnetic attraction force acting on the armature 10 acts in the negative Z-axis direction, as long as the armature 10 is not shifted to some extent from the in-field-magnet central plane CS in the positive Z-axis direction, as described above. Therefore, as illustrated in FIG. 4, the armature 10 can be configured so that a constant magnetic attraction force is applied to the armature 10 in the negative Z-axis direction within the movable range allowed by the support mechanism.

The back yoke 11A of the armature 10 may be provided at an end of the armature 10 in the positive. Z-axis direction and the teeth 11B may be provided to protrude from the back yoke 11A in the negative Z-axis direction. In this case, the armature 10 can be configured so that a constant magnetic attraction force is applied to the armature 10 in the positive Z-axis direction within the movable range allowed by the support mechanism.

Here, the armature 10 may be configured so that the magnetic attraction force is applied to the armature 10 in one direction of the positive Z-axis direction or the negative Z-axis direction mostly in the movable range in the Z-axis direction, and the magnetic attraction force is applied to the armature 10 in the other direction of the positive Z-axis direction or the negative Z-axis direction in the remaining portion (i.e., an end portion) of the movable range.

As described, in the second embodiment, the armature 10 is configured to have an asymmetrical property between the magnetic action caused by the permanent magnet 21 between the armature 10 and the field magnet section 20A and the magnetic action caused by the permanent magnet 21 between the armature 10 and the field magnet section 20B. Specifically, the core 11 of the armature 10 has a magnetically asymmetrical structure in the Z-axis direction. More specifically, the shape of the core 11 is configured to be asymmetrical in the Z-axis direction.

Thus, the armature 10 can be configured so that the direction of the force acting on the armature 10 in the Z-axis direction does not readily change. Therefore, the second embodiment provides the same action and effect as the first embodiment.

In the second embodiment, the armature 10 may have the above-described asymmetrical property so that the magnetic attraction force acting on the armature 10 in the Z-axis direction over the entire movable range of the mover in the Z-axis direction is either in a direction toward the field magnet section 20A or in a direction toward the field magnet section 20B.

Therefore, because the direction of the force acting on the armature 10 in the Z-axis direction does not change, vibration of the armature 10 can be further suppressed and thus an increase in the cost of the linear motor 1 including the support mechanism can be further reduced, as in the first embodiment.

Third Embodiment

Next, with reference to FIG. 5 and FIG. 6, a linear motor 1 according to a third embodiment will be described.

In the following, parts different from the first embodiment will be mainly described, and the description of contents the same as or corresponding to the first and second embodiments may be simplified or omitted.

<Configuration of the Linear Motor>

Figure 5:
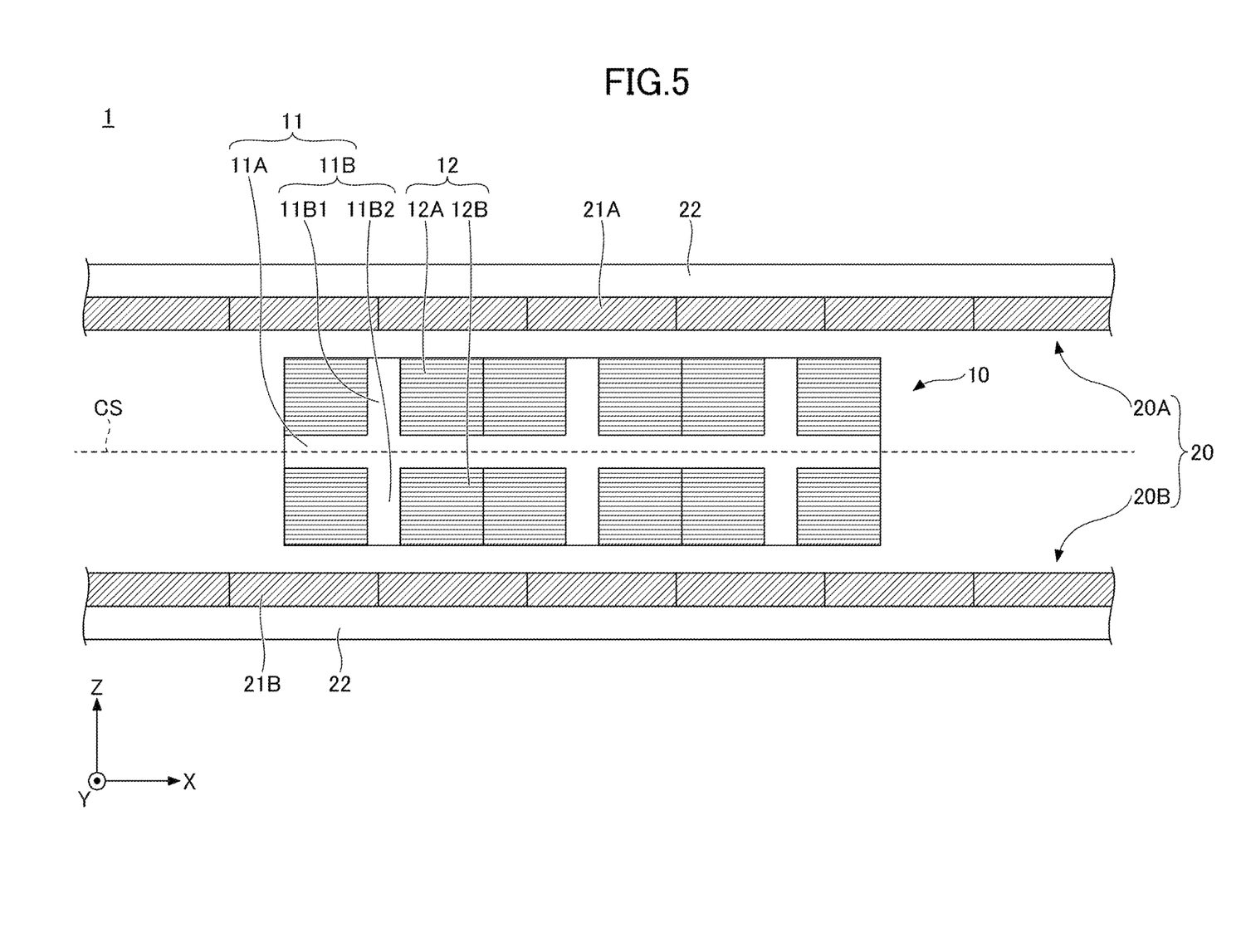
FIG. 5 is a drawing illustrating an example of a linear motor according to a third embodiment.

FIG. 5 is a drawing illustrating an example of the linear motor 1 according to the third embodiment.

As illustrated in FIG. 5, the linear motor 1 includes the armature 10 and the field magnet 20, as in the first embodiment.

As in the first embodiment, the armature 10 is a mover and includes the core 11 and the coil 12.

As in the first embodiment, the entirety of the core 11 is made of the same soft magnetic material, and has substantially the same magnetic permeability throughout.

As in the first embodiment, the core 11 includes the back yoke 11A and the teeth 11B.

As in the first embodiment, the teeth 11B include the teeth 11B1 and 11B2.

The armature 10 has a shape substantially the same as the shape in the first embodiment. However, unlike the first embodiment, the armature 10 is disposed such that the armature reference plane is aligned with the in-field-magnet central plane CS at the reference displacement position. That is, the armature 10 is disposed at a substantially central position in the Z-axis direction between the field magnet sections 20A and 20B.

As in the first embodiment, the field magnet 20 includes the field magnet sections 20A and 20B.

The field magnet section 20A includes a permanent magnet 21A and the back yoke 22.

The permanent magnets 21A, as with the permanent magnets 21 according to the first embodiment, are arranged side by side in the X-axis direction so as to face the armature 10 as viewed in the positive Z-axis direction from the armature 10. The permanent magnet 21A has a shape substantially the same as a permanent magnet 21B, but has a higher remnant magnetic flux density than the permanent magnet 21B.

The field magnet section 20B includes the permanent magnet 21B and the back yoke 22.

The permanent magnets 21B, as with the permanent magnets 21 according to the first embodiment, are arranged side by side in the X-axis direction so as to face the armature 10 as viewed in the negative Z-axis direction from the armature 10. As described above, the permanent magnet 21B has a shape substantially the same as the permanent magnet 21A, but has a lower remnant flux density than the permanent magnet 21A.

The field magnet sections 20A and 20B are configured such that the arrangement specifications of the permanent magnets 21A and 21B are substantially the same. With respect to this, the magnetic specifications (i.e., the residual magnetic flux density) of the field magnet sections 20A and 20B differ from each other. This enables the field magnet section 20A and the field magnet section 20B to generate magnetic flux asymmetrical with respect to the in-field-magnet central plane CS in a space in which the field magnet section 20A and the field magnet section 20B face each other in the Z-axis direction. Specifically, the magnetic flux of the magnetic pole of the surface, facing the armature 10, of the permanent magnet 21A in the field magnet section 20A is greater than the magnetic flux of the magnetic pole of the surface, facing the armature 10, of the permanent magnet 21B in the field magnet section 20B.

<Magnetic Attraction Force Acting on the Mover>

Figure 6:
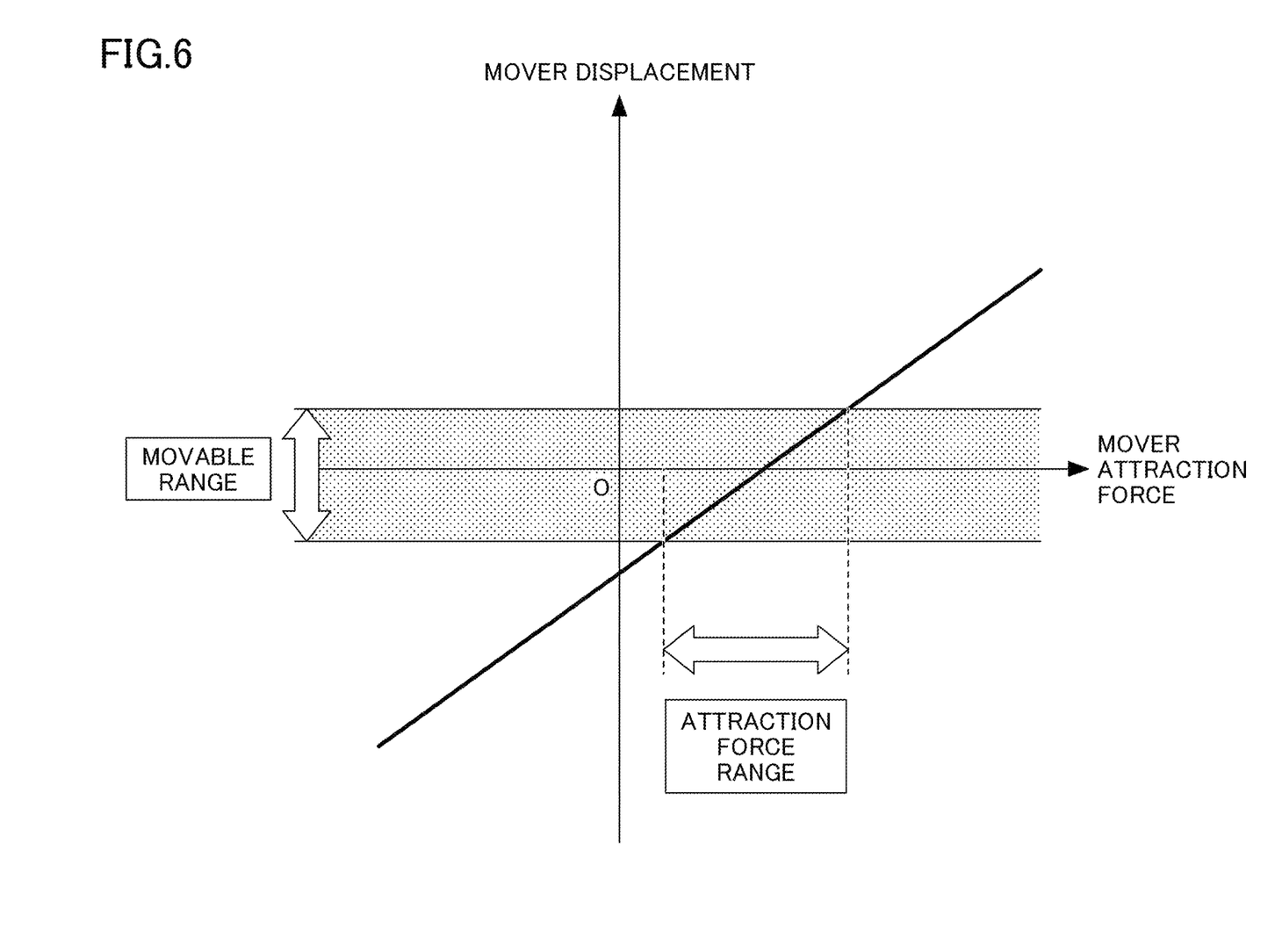
FIG. 6 is a graph illustrating a relation of the displacement of the mover and the attraction force acting on the mover.

FIG. 6 is a graph illustrating the relation between the displacement of the mover (in the Z-axis direction) and the attraction force acting on the mover (i.e., the armature 10). Specifically, the graph indicates the relation between the displacement position of the armature 10 in the Z-axis direction with respect to the in-field-magnet central plane CS and the magnetic attraction force acting on the armature 10 (i.e., the core 11) in the Z-axis direction, caused by the interaction between the armature 10 (i.e., the core 11) and the field magnet 20 (i.e., the permanent magnets 21A and 21B). The displacement position of the armature 10 in the Z-axis direction is defined based on the armature reference plane.

As described above, the core 11 of the armature 10 has the same magnetic permeability throughout and has a shape substantially symmetrical in the Z-axis direction with respect to the armature reference plane. The magnetic fields generated by the field magnet section 20A and the field magnet section 20B are asymmetrical with respect to the in-field-magnet central plane CS, and the magnetic flux density in a gap between the field magnet section 20A and the armature 10 is larger than the magnetic flux density in a gap between the field magnet section 20B and the armature 10. This is because the residual magnetic flux density of the permanent magnet 21A of the field magnet section 20A is higher than the residual magnetic flux density of the permanent magnet 21B of the field magnet section 20B. Thus, even if the displacement position of the armature 10 is at the in-field-magnet central plane CS, the magnetic attraction force acting on the armature 10 from the field magnet section 20A is greater than the magnetic attraction force acting on the armature 10 from the field magnet section 20B, and the magnetic attraction force is applied to the armature 10 in the positive Z-axis direction.

Further, if the displacement position of the armature 10 is shifted from the in-field-magnet central plane CS in the positive Z-axis direction, the magnetic attraction force acting on the armature 10 from the field magnet section 20A in the positive Z-axis direction further increases, and the magnetic attraction force acting on the armature 10 from the field magnet section 20B in the negative Z-axis direction is further reduced. As the shift amount increases, the difference between the magnetic attraction force acting on the armature 10 from the field magnet section 20A in the positive Z-axis direction and the magnetic attraction force acting on the armature 10 from the field magnet section 20B in the negative Z-axis direction increases in a substantially proportional manner. Therefore, as illustrated in FIG. 6, if the displacement position of the armature 10 is shifted from the in-field-magnet central plane CS in the positive Z-axis direction, the magnetic attraction force acting on the armature 10 in the positive Z-axis direction increases substantially in proportion to the shift amount.

If the displacement position of the armature 10 is shifted from the in-field-magnet central plane CS in the negative Z-axis direction, the magnetic attraction force acting on the armature 10 from the field magnet section 20A in the positive Z-axis direction decreases, and the magnetic attraction force acting on the armature 10 from the field magnet section 20B in the negative Z-axis direction increases. As the shift amount increases, the difference between the magnetic attraction force acting on the armature 10 from the field magnet section 20A in the positive Z-axis direction and the magnetic attraction force acting on the armature 10 from the field magnet section 20B in the negative Z-axis direction decreases in a substantially proportional manner. If the displacement position of the armature 10 is shifted from the in-field-magnet central plane CS in the negative Z-axis direction to some extent, the magnitude relation between the magnetic attraction force acting on the armature 10 from the field magnet section 20A and the magnetic attraction force acting on the armature 10 from the field magnet section 20B is reversed. Therefore, as illustrated in FIG. 6, if the displacement position of the armature 10 is shifted from the in-field-magnet central plane CS in the negative direction of the Z-axis, the magnetic attraction force acting on the armature 10 in the positive Z-axis direction decreases substantially in proportion to the shift amount, and the magnetic attraction force acting on the armature 10 becomes zero at a certain shift amount. Then, if the displacement position of the armature 10 is further shifted from a position corresponding to the certain shift amount in the negative Z-axis direction, the magnetic attraction force acting on the armature 10 in the negative Z-axis direction increases substantially in proportion to the shift amount.

In this example, as illustrated in FIG. 5, the armature 10 is disposed substantially at the center in the Z-axis direction between the field magnet sections 20A and 20B so as to include a position corresponding to the in-field-magnet central plane CS in the Z-axis direction within the movable range of the support mechanism. Therefore, as illustrated in FIG. 6, the movable range of the armature 10 that is allowed by the support mechanism is set to be a range in the positive Z-axis direction and the negative Z-axis direction centered on the in-field-magnet central plane CS.

With respect to the above, the magnetic attraction force acting on the armature 10 is applied in the positive Z-axis direction, as long as the armature 10 is not shifted from the in-field-magnet central plane CS in the negative Z-axis direction to some extent, as described above. Therefore, as illustrated in FIG. 6, the field magnets 20 (i.e., the field magnet sections 20A and 20B) can be configured so that a constant magnetic attraction force is applied to the armature 10 in the positive Z-axis direction within the movable range allowed by the support mechanism.

Alternatively, the residual magnetic flux density of the permanent magnet 21B may be set higher than the residual magnetic flux density of the permanent magnet 21A. In this case, the field magnet 20 can be configured so that a constant magnetic attraction force is applied to the armature 10 in the negative Z-axis direction within the movable range allowed by the support mechanism.

Here, the field magnet 20 may be configured so that the magnetic attraction force is applied to the armature 10 in one direction of the positive Z-axis direction or the negative Z-axis direction mostly in the movable range in the Z-axis direction, and the magnetic attraction force is applied to the armature 10 in the other direction of the positive Z-axis direction or the negative direction in the remaining portion (an end portion) of the movable range.

As described, in the third embodiment, the field magnet 20 is configured to have an asymmetrical property between the magnetic action caused by the permanent magnet 21A between the armature 10 and the field magnet section 20A and the magnetic action caused by the permanent magnet 21B between the armature 10 and the field magnet section 20B. Specifically, the permanent magnet 21A of the field magnet section 20A and the permanent magnet 21B of the field magnet section 20B are configured so that the magnetic fields acting on the armature 10 in the Z-axis direction are asymmetrical with each other. More specifically, the residual magnetic flux density of the permanent magnet 21A differs from that of the permanent magnet 21B.

With the above-described configuration, the field magnet 20 may be configured so that the direction of the force acting on the armature 10 in the Z-axis direction does not readily change. Therefore, the third embodiment provides the same action and effect as the first embodiment.

In the third embodiment, the field magnet 20 may have the above-described asymmetrical property so that the magnetic attraction force acting on the armature 10 in the Z-axis direction throughout the entire movable range of the mover in the Z-axis direction is either in a direction toward the field magnet section 20A or in a direction toward the field magnet section 20B.

Therefore, because the direction of the force acting on the armature 10 in the Z-axis direction is not changed, vibration of the armature 10 can be further suppressed and the increase of the cost of the linear motor 1 including the support mechanism can be further reduced, as in the first embodiment.

Fourth Embodiment

Next, with reference to FIG. 7 and FIG. 8, a linear motor 1 according to a fourth embodiment will be described.

In the following, parts different from the first embodiment will be mainly described, and the description of contents the same as or corresponding to the first to third embodiments may be simplified or omitted.

<Configuration of the Linear Motor>

Figure 7:
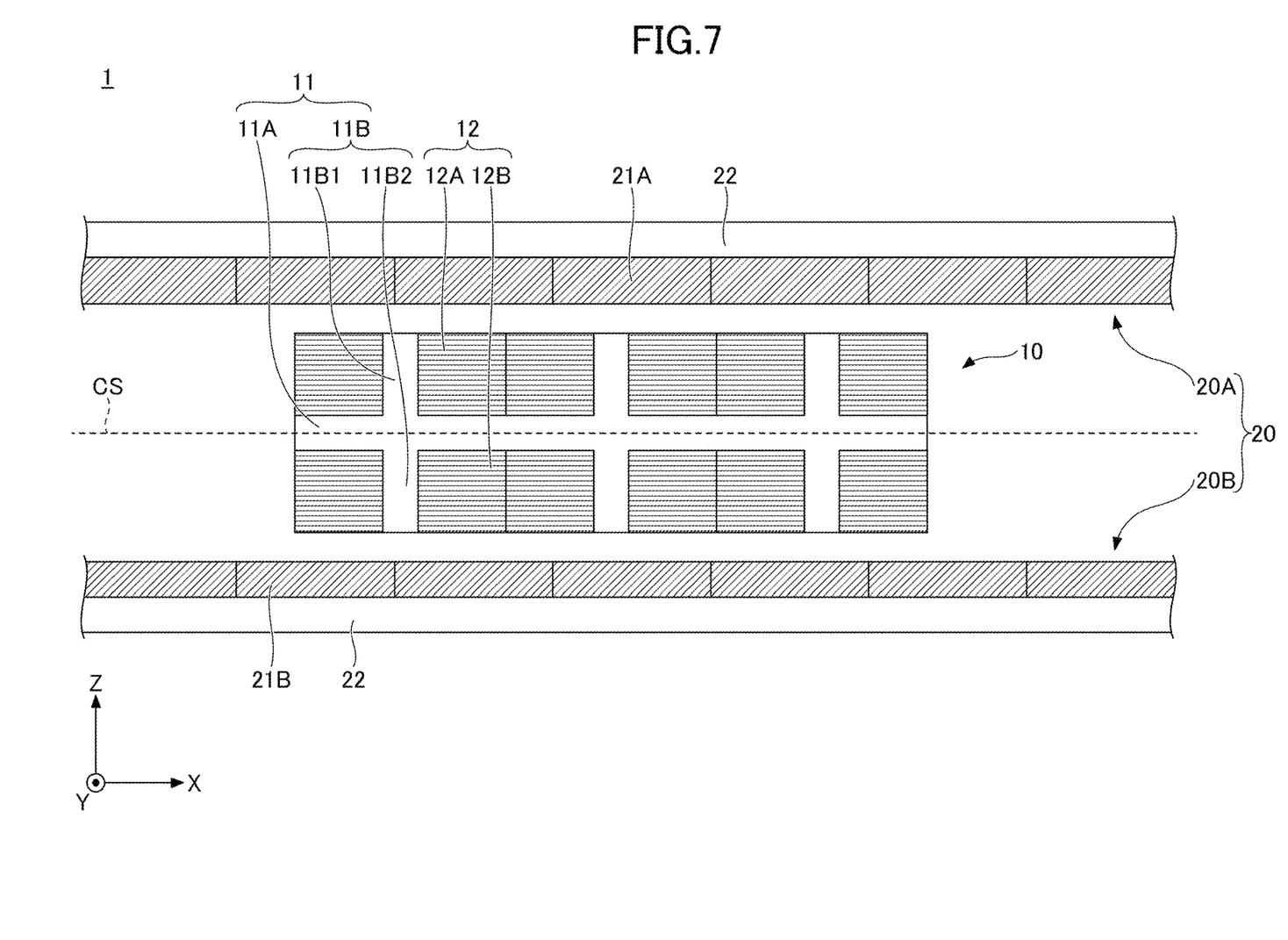
FIG. 7 is a drawing illustrating an example of a linear motor according to a fourth embodiment.

FIG. 7 is a drawing illustrating an example of the linear motor 1 according to the fourth embodiment.

As illustrated in FIG. 7, as in the first embodiment, the linear motor 1 includes the armature 10 and the field magnet 20.

As in the first embodiment, the armature 10 is a mover and includes the core 11 and the coil 12.

As in the first embodiment, the entirety of the core 11 is made of the same soft magnetic material and has substantially the same magnetic permeability throughout.

As in the first embodiment, the core 11 includes the back yoke 11A and the teeth 11B.

As in the first embodiment and the third embodiment, the teeth 11B include the teeth 11B1 and 11B2.

The armature 10 has a shape substantially the same as the shape of the armature 10 according to the first and third embodiments. As in the third embodiment, the armature 10 is disposed such that the armature reference plane is aligned with the in-field-magnet central plane CS at the reference displacement position. That is, the armature 10 is disposed at a substantially central position in the Z-axisdirection between the field magnet sections 20A and 20B.

As in the first embodiment, the field magnet 20 includes the field magnet sections 20A and 20B.

As in the third embodiment, the field magnet section 20A includes the permanent magnet 21A and the back yoke 22.

As in the third embodiment, the permanent magnets 21A are arranged side by side in the X-axis direction so as to face the armature 10 as viewed in the positive Z-axis direction from the armature 10. Unlike the third embodiment, the permanent magnet 21A has the same residual magnetic flux density as the permanent magnet 21B, but has a greater thickness in the Z-axis direction than the permanent magnet 21B.

The field magnet section 20B includes the permanent magnet 21B and the back yoke 22, as in the third embodiment.

As in the third embodiment, the permanent magnets 21B are arranged side by side in the X-axis direction so as to face the armature as viewed in the negative Z-axis direction from the armature 10. Unlike the third embodiment, the permanent magnet 21B has the same residual magnetic flux density as the permanent magnet 21A, but is thinner in the Z-axis direction than the permanent magnet 21A.

The field magnet sections 20A and 20B are configured such that the arrangement of the permanent magnets 21A and 21B are substantially the same. With respect to this, in the field magnet sections 20A and 20B, the magnetic specifications (i.e., the thickness in the Z-axis direction) of the permanent magnets 21A and 21B differ from each other. Thus, the field magnet section 20A and the field magnet section 20B can generate magnetic flux asymmetrical with respect to the in-field-magnet central plane CS in a space in which the field magnet section 20A and the field magnet section 20B face each other in the Z-axis direction. Specifically, the magnetic flux of the magnetic pole of the surface, facing the armature 10, of the permanent magnet 21A of the field magnet section 20A is greater than the magnetic flux of the magnetic pole of the surface, facing the armature 10, of the permanent magnet 21B of the field magnet section 20B.

<Magnetic Attraction Force Acting on the Mover>

Figure 8:
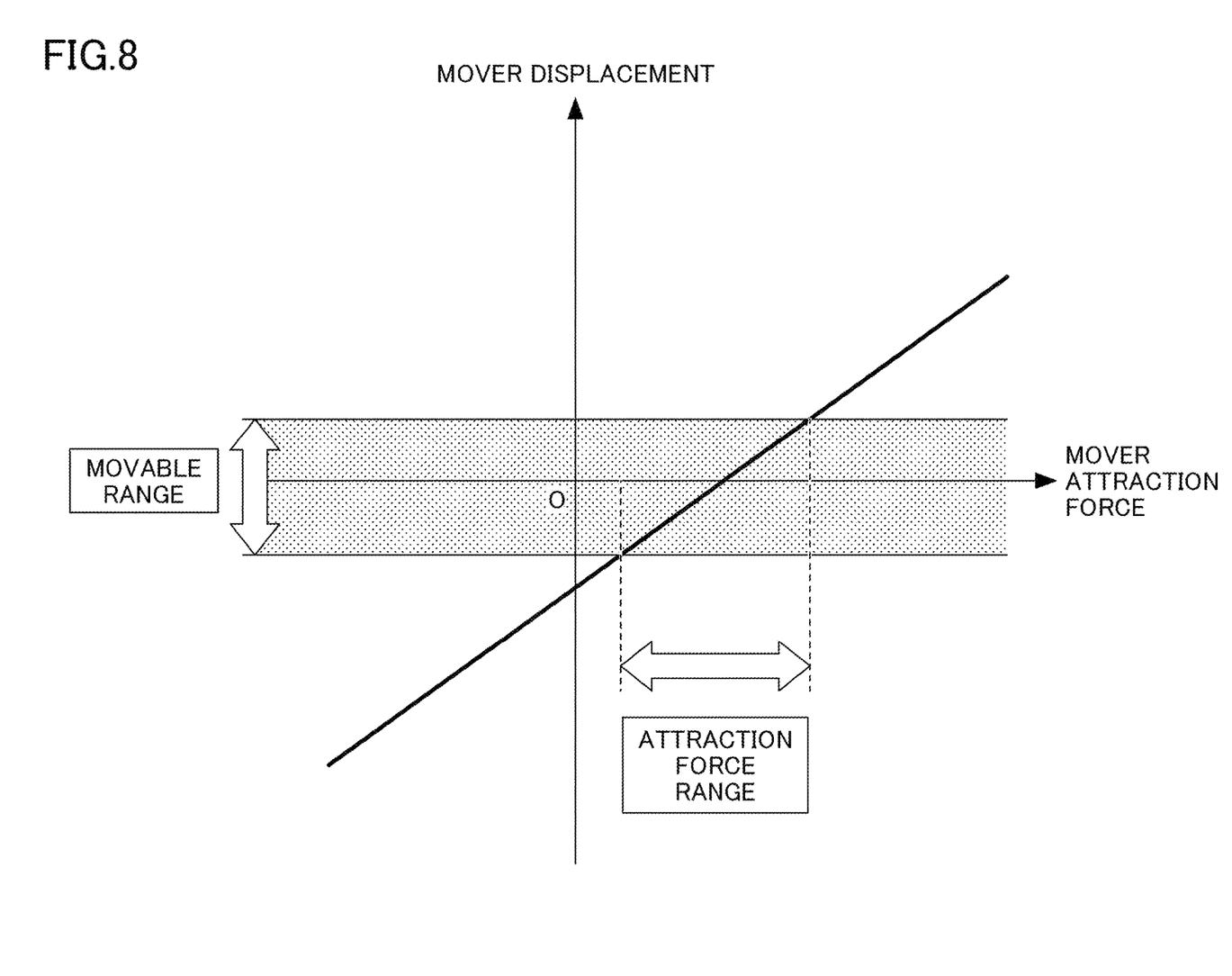
FIG. 8 is a graph illustrating a relation of the displacement of the mover and the attraction force acting on the mover.

FIG. 8 is a graph illustrating the relation between the displacement of the mover (in the Z-axis direction) and the attraction force acting on the mover (i.e., the armature 10). Specifically, the graph indicates the relation between the displacement position of the armature 10 in the Z-axis direction with respect to the in-field-magnet central plane CS and the magnetic attraction force acting on the armature 10 (i.e., the core 11) in the Z-axis direction that is caused by the interaction between the armature 10 (i.e., the core 11) and the field magnet 20 (i.e., the permanent magnets 21A and 21B). The displacement position of the armature 10 in the Z-axis direction is defined based on the armature reference plane.

As described above, the core 11 of the armature 10 has the same magnetic permeability throughout and a shape substantially symmetrical in the Z-axis direction with respect to the armature reference plane. The magnetic fields generated by the field magnet section 20A and the field magnet section 20B are asymmetrical with respect to the in-field-magnet central plane CS, and the magnetic flux density of a gap between the field magnet section 20A and the armature 10 is higher than the magnetic flux density of a gap between the field magnet section 20B and the armature 10. This is because the thickness of the permanent magnet 21A of the field magnet section 20A in the Z-axis direction is greater than the thickness of the permanent magnet 21B of the field magnet section 20B in the Z-axis direction. Thus, even if the displacement position of the armature 10 is at the in-field-magnet central plane CS, the magnetic attraction force acting on the armature 10 from the field magnet section 20A is greater than the magnetic attraction force acting on the armature 10 from the field magnet section 20B, and the magnetic attraction force is applied to the armature 10 in the positive Z-axis direction.

If the displacement position of the armature 10 is shifted from the in-field-magnet central plane CS in the positive Z-axis direction, the magnetic attraction force acting on the armature 10 from the field magnet section 20A in the positive Z-axis direction further increases, and the magnetic attraction force acting on the armature 10 from the field magnet section 20B in the negative Z-axis direction is further reduced. As the shift amount increases, the difference between the magnetic attraction force acting on the armature 10 from the field magnet section 20A in the positive Z-axis direction and the magnetic attraction force acting on the armature 10 from the field magnet section 20B in the negative Z-axis direction increases in a substantially proportional manner. Therefore, as illustrated in FIG. 8, if the displacement position of the armature 10 is shifted from the in-field-magnet central plane CS in the positive Z-axis direction, the magnetic attraction force acting on the armature 10 in the positive Z-axis direction further increases substantially in proportion to the shift amount.

If the displacement position of the armature 10 is shifted from the in-field-magnet central plane CS in the negative Z-axis direction, the magnetic attraction force acting on the armature 10 from the field magnet section 20A in the positive Z-axis direction decreases, and the magnetic attraction force acting on the armature 10 from the field magnet section 20B in the negative Z-axis direction increases. As the shift amount increases, the difference between the magnetic attraction force acting on the armature 10 from the field magnet section 20A in the positive Z-axis direction and the magnetic attraction force acting on the armature 10 from the field magnet section 20B in the negative Z-axis direction decreases in a substantially proportional manner. If the displacement position of the armature 10 is shifted from the in-field-magnet central plane CS in the negative Z-axis direction to some extent, the magnitude relation between the magnetic attraction force acting on the armature 10 from the field magnet section 20A and the magnetic attraction force acting on the armature 10 from the field magnet section 20B is reversed. Therefore, as illustrated in FIG. 8, if the displacement position of the armature 10 is shifted from the in-field-magnet central plane CS in the negative Z-axis direction, the magnetic attraction force acting on the armature 10 in the positive Z-axis direction decreases substantially in proportion to the shift amount, and the magnetic attraction force acting on the armature 10 becomes zero at a certain shift amount. Then, if the displacement position of the armature 10 is further shifted from a position corresponding to the certain shift amount in the negative Z-axis direction, the magnetic attraction force acting on the armature 10 in the negative Z-axis direction increases substantially in proportion to the shift amount.

In this example, as illustrated in FIG. 7, the armature 10 is disposed substantially at the center between the field magnet sections 20A and 20B in the Z-axis direction so as to include a position corresponding to the in-field-magnet central plane CS in the Z-axis direction within the movable range of the support mechanism. Therefore, as illustrated in FIG. 8, the movable range allowed by the support mechanism of armature 10 is set to be in the range in the positive Z-axis direction and the negative Z-axis direction centered on the in-field-magnet central plane CS.

With respect to the above, the magnetic attraction force acting on the armature 10 is applied in the positive Z-axis direction, as long as the armature 10 is not shifted from the in-field-magnet central plane CS. in the negative Z-axis direction to some extent, as described above. Therefore, as illustrated in FIG. 8, the field magnet 20 (i.e., the field magnet sections 20A and 20B) can be configured so that a constant magnetic attraction force is applied to the armature 10 in the positive Z-axis direction within the movable range allowed by the support mechanism.

Alternatively, the thickness of the permanent magnet 21B in the Z-axis direction may be set greater than the thickness of the permanent magnet 21A in the Z-axis direction. In this case, the field magnet 20 can be configured so that a constant magnetic attraction force is applied to the armature 10 in the negative Z-axis direction within the movable range allowed by the support mechanism.

Here, the field magnet 20 may be configured so that the magnetic attraction force is applied to the armature 10 in one direction of the positive Z-axis direction or the negative Z-axis direction, mostly in the movable range in the Z-axis direction, and the magnetic attraction force is applied in the other direction of the positive Z-axis direction or the negative Z-axis direction in the remaining portion (i.e., an end portion) of the movable range.

As described, in the fourth embodiment, the field magnet 20 is configured to have an asymmetrical property between the magnetic action caused by the permanent magnet 21A between the armature 10 and the field magnet section 20A and the magnetic action caused by the permanent magnet 21B between the armature 10 and the field magnet section 20B. Specifically, the permanent magnet 21A of the field magnet section 20A and the permanent magnet 21B of the field magnet section 20B are configured so that the magnetic fields acting on the armature 10 in the Z-axis direction are asymmetrical with each other. More specifically, the shapes of the permanent magnets 21A and 21B may be asymmetrical in the Z-axis direction to each other.

With the above-described configuration, the field magnet 20 may be configured so that the direction of the force acting on the armature 10 in the Z-axis direction does not readily change. Therefore, the fourth embodiment provides the same action and effect as the first embodiment.

In the fourth embodiment, the field magnet 20 may have the above-described asymmetrical property so that the magnetic attraction force acting on the armature 10 in the Z-axis direction over the entire movable range of the mover in the Z-axis direction is either in a direction toward the field magnet section 20A or in a direction toward the field magnet section 20B.

Therefore, because the direction of the force acting on the armature 10 in the Z-axis direction is not changed, as in the first embodiment, vibration of the armature 10 can be further suppressed and the increase of the cost of the linear motor 1 including the support mechanism can be further reduced.

Other Embodiments

Next, other embodiments will be described.

The embodiments described above may be suitably combined or modified accordingly.

For example, in the second embodiment, the core 11 of the armature 10 may be configured such that the magnetic permeability is asymmetrical instead of being an asymmetrical shape in the Z-axis direction with reference to the armature reference plane, so that a magnetically asymmetrical structure is achieved. Specifically, the core 11 may have the same shape as the core 11 of the first embodiment, but may be configured such that different soft magnetic materials are used in the positive Z-axis direction from the armature reference plane and in the negative Z-axis direction from the armature reference plane.

Additionally, for example, configurations in the above-described embodiments that achieve the asymmetrical property between the magnetic action caused by the permanent magnet between the armature 10 and the field magnet section 20A and the magnetic action caused by the permanent magnet between the armature 10 and the field magnet section 20B may be suitably combined. That is, at least one of the armature 10 or the field magnet 20 may be configured to have an asymmetrical property between the magnetic action caused by the permanent magnet between the armature 10 and the field magnet section 20A and the magnetic action caused by the permanent magnet between the armature 10 and the field magnet section 20B.

For example, in the above-described embodiments, the linear motor 1 may be configured such that the armature 10 is a stator and the field magnet 20 is a mover. In this case, the armature 10 is arranged to extend in the X-axis direction in accordance with the range of movement of the field magnet 20 in the X-axis direction as a mover, and the field magnet 20 may be supported by a support mechanism such that the armature 10 is surrounded on a plane perpendicular to the X-axis direction (i.e., a YZ plane).

For example, in the above-described embodiments, the linear motor 1 may be arranged such that the field magnet 20 is interposed between a first armature section (i.e., an example of a first section) and a second armature section (i.e., an example of a second section) of the armature 10. In this case, at least one of the armature 10 or the field magnet 20 is configured to have an asymmetrical property between the magnetic action caused by the permanent magnet between the field magnet 20 and the first armature section and the magnetic action caused by the permanent magnet between the field magnet 20 and the second armature section.

Specifically, the field magnet 20 may be disposed to be shifted to the first armature section or the second armature section from the central plane in the Z-axis direction between the first armature section and the second armature section.

The core 11 included in the first armature section and the core 11 included in the second armature section may have a magnetically asymmetrical structure in the Z-axis direction. More specifically, the core 11 included in the first armature section and the core 11 included in the second armature section may be configured to have an asymmetrical property in the shape or the magnetic permeability in the Z-axis direction.

The permanent magnets 21A and 21B of the field magnet 20 may be configured to have an asymmetrical property between a magnetic field acting on the first armature section and a magnetic field acting on the second armature section in the Z-axis direction. More specifically, the residual magnetic flux density of the permanent magnet 21A that generates the magnetic field acting on the first armature section may be different from the residual magnetic flux density of the permanent magnet 21B that generates the magnetic field acting on the second armature section. The shape of the permanent magnet 21A that generates the magnetic field acting on the first armature section may be asymmetrical in the Z-axis direction with respect to the shape of the permanent magnet 21B that generates the magnetic field acting on the second armature section.

Modification and Alteration

Although the embodiments have been described in detail above, the disclosure is not limited to the particulars of the described embodiments, and various modifications and alterations can be made within the scope of the claimed subject matter.

For example, in the above-described embodiments, the mover of the linear motor 1 may be configured to move along a curve rather than along a line corresponding to the X-axis direction. In this case, for example, the field magnet sections 20A and 20B arranged such that the armature 10 is interposed may have substantially parallel curved shapes viewed in the Y-axis direction. In this case, "parallel" indicates a state in which two lines (including curves) do not intersect while maintaining an equal space.

What is claimed is:

1. A linear motor comprising:
    an armature that includes a coil and a core, the core being made of a soft magnetic material; and
    a field magnet that includes a permanent magnet, the permanent magnet generating a magnetic field for the armature,
    wherein one of the armature or the field magnet is a mover and the other of the armature or the field magnet is a stator, the stator including a first section and a second section;
    wherein the armature and the field magnet are arranged such that the mover is interposed between the first section and the second section,
    wherein at least one of the armature or the field magnet is configured to have an asymmetrical property between a first magnetic action and a second magnetic action, the first magnetic action being caused by the permanent magnet between the mover and the first section, and the second magnetic action being caused by the permanent magnet between the mover and the second section, and
    wherein at least one of the armature or the field magnet is configured to have the asymmetrical property such that, throughout an entire movable range of the mover in an axial direction in which the mover faces the first section and the second section, a force acting on the mover in the axial direction is either in a direction toward the first section or in a direction toward the second section.

2. The linear motor as claimed in claim 1, wherein the mover is disposed to be shifted toward the first section or the second section.

3. The linear motor as claimed in claim 1,
    wherein the mover is the armature and the stator is the field magnet, and
    wherein the core has a magnetically asymmetrical structure in an axial direction in which the armature faces the first section and the second section of the field magnet.

4. The linear motor as claimed in claim 3, wherein the core is further configured to be asymmetrical in shape or magnetic permeability in the axial direction.

5. The linear motor as claimed in claim 1,
    wherein the mover is the field magnet and the stator is the armature, and
    wherein the core included in the first section and the core included in the second section have a magnetically asymmetrical structure in an axial direction in which the field magnet faces the first section and the second section of the armiture.

6. The linear motor as claimed in claim 5, wherein the core included in the first section and the core included in the second section are configured to be asymmetrical in a shape or magnetic permeability in the axial direction.

7. The linear motor as claimed in claim 1,
    wherein the mover is the armature and the stator is the field magnet, and
    wherein the permanent magnet of the first section and the permanent magnet of the second section are configured to have the asymmetrical property between magnetic fields acting on the armature in an axial direction in which the armature faces the first section and the second section of the field magnet.

8. The linear motor as claimed in claim 7, wherein a remnant magnetic flux density of the permanent magnet of the first section is different from a remnant magnetic flux density of the permanent magnet of the second section.

9. The linear motor as claimed in claim 7, wherein a shape of the permanent magnet of the first section is asymmetrical with a shape of the permanent magnet of the second section with respect to the axial direction.

10. The linear motor as claimed in claim 1,
wherein the mover is the field magnet and the stator is the armature, and
wherein the permanent magnet is configured to have the asymmetrical property between a magnetic field acting on the first section and a magnetic field acting on the second section in an axial direction in which the field magnet faces the first section and the second section of the armature.

11. A linear motor comprising:
an armature that includes a coil and a core, the core being made of a soft magnetic material; and
a field magnet that includes a permanent magnet, the permanent magnet generating a magnetic field for the armature,
wherein one of the armature or the field magnet is a mover and the other of the armature or the field magnet is a stator, the stator including a first section and a second section;
wherein the armature and the field magnet are arranged such that the mover is interposed between the first section and the second section,
wherein at least one of the armature or the field magnet is configured to have an asymmetrical property between a first magnetic action and a second magnetic action, the first magnetic action being caused by the permanent magnet between the mover and the first section, and the second magnetic action being caused by the permanent magnet between the mover and the second section, and
wherein the mover is disposed to be shifted toward the first section or the second section.

* * * * *